Dec. 12, 1939.  F. W. REYNOLDS  2,183,204
ELECTRO-OPTICAL SYSTEM
Filed May 29, 1937
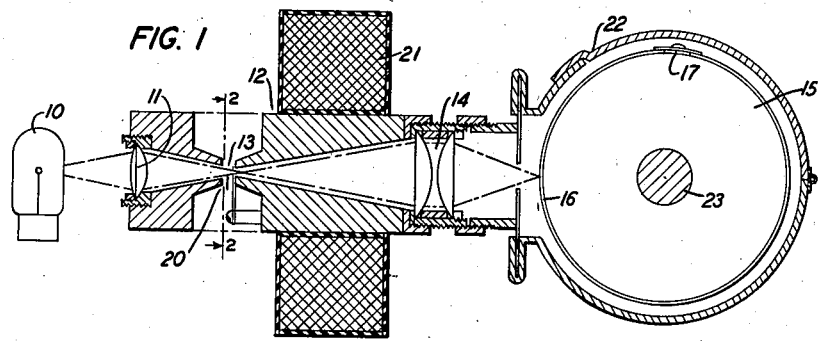
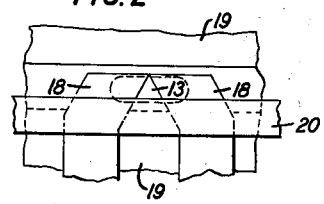
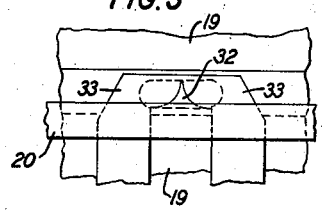
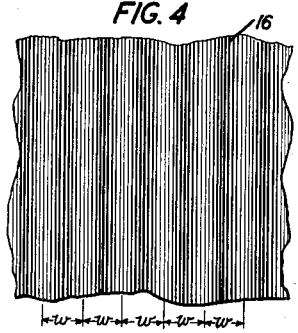
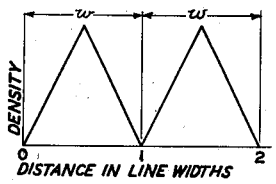
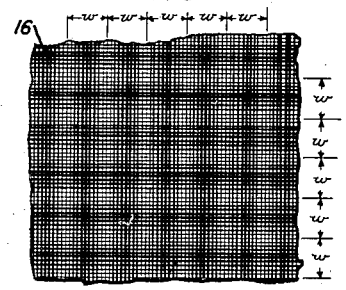
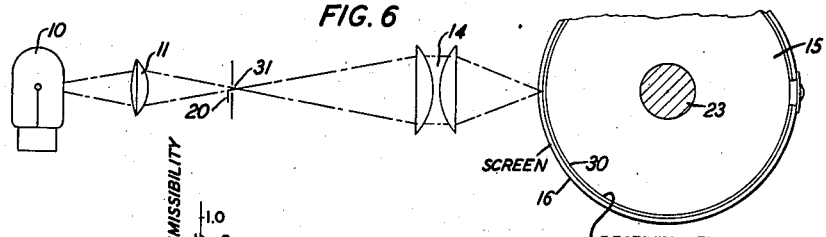
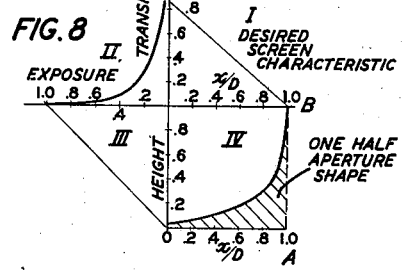
INVENTOR
F. W. REYNOLDS
BY
ATTORNEY Patented Dec. 12, 1939

2,183,204

UNITED STATES PATENT OFFICE 2,183,204

ELECTRO-OPTICAL SYSTEM

Frederick W. Reynolds, Ridgewood, N. J., assignor to Bell Telephone Laboratories, Incorporated, New York, N. Y., a corporation of New York Application May 29, 1937, Serial No. 145,441

7 Claims. (Cl. 95—81)

This invention relates to electro-optical devices and more specifically to telephotography.

It is an object of this invention to provide methods of and apparatus for obtaining pictures on receiving telephotographic equipment with a suitable structure for direct printing on metal.

It is a further object of this invention to provide a novel method of making a variable density cross-line screen suitable for use in telephotography or photoengraving to produce structures suitable for direct printing on metal.

It is a further object of this invention to provide a variable density cross-line screen which in part at least compensates for distortion inherent in certain of, or all, the various stages of the photographic and photoengraving processes.

It is a further object of this invention to provide a simple and controllable method for making variable density cross-line screens having the desired optical characteristics for use with pictures having different degrees of contrast, such as flat, normal or contrasty.

The invention which is explained herein relates in certain of its aspects primarily to telephotography while in certain of its aspects it is not limited thereto, as, for example, it may be useful in photoengraving. In accordance with one aspect of the invention, a variable density screen is provided which may be used in telephotography or photoengraving to produce suitable structure on the photographic emulsion for direct printing on metal. This variable density cross-line screen comprises a film including a plurality of adjacent squares or other rectangles whose optical transmission is a maximum at the center of each rectangle and which decreases to a minimum at the sides. The optical transmission for each rectangle is made to vary linearly from the center to the sides as is the case in the well-known so-called "variable density cross-line screen" or it is made to vary in a non-linear manner in order to compensate for distortions introduced in the various steps of the process of transmitting and reproduction, or for the more pronounced of these distortions.

In accordance with the invention, such a screen may be made by mounting a light sensitive film on a support, exposing each elemental line of the film in turn through a light valve aperture of such shape that the exposure of the film varies in intensity from a minimum at the edges to a maximum at the center, removing the film, remounting the film on the support at right angles to its position on the first mounting, and re-exposing the film through the aperture. After this film is developed, fixed and dried in accordance with well-known photographic technique, it is placed in contact with the emulsion of the receiving film mounted on a drum at the telephotographic receiving station. Light varying in accordance with the light-tone values of the successively scanned elemental areas of the object at the telephotographic transmitting station passes through the variable density screen in such a manner that different size printing dots or areas are formed on the receiving emulsion so that the received picture is structured suitable for direct printing on metal.

The aperture used in making the variable density screen is preferably so shaped that it introduces desired correction for distortion, as mentioned above.

The invention will be more readily understood by referring to the following description taken in connection with the accompanying drawing forming a part thereof, in which:

Fig. 1 is a diagrammatic showing, partly in cross-section, of apparatus for making a variable density cross-line screen in accordance with this invention;

Figs. 2 and 3 are showings of structures which may be alternately used in Fig. 1 to determine the shape of the aperture;

Fig. 4 shows a portion of the screen which may be made by the apparatus shown in Fig. 1 after one step of the process, shading lines being drawn to represent the exposure;

Fig. 5 shows the screen of Fig. 4 after the second step of the process, shading lines being drawn to represent the exposure;

Fig. 6 shows a telephotographic receiving apparatus with a variable density cross-line screen in place;

Fig. 7 is a graphical representation included to aid in the explanation of the operation of the invention; and Fig. 8 is a graphical representation included to aid in the explanation of the method of making a cross-line screen to compensate for distortion.

Referring more particularly to the drawing, Fig. 1 shows apparatus for making a variable density cross-line screen. A variable density cross-line screen as the term is used in this specification may be defined as a film or plate of material having a photographic emulsion thereon which has been exposed, developed, fixed, and dried, the pattern on the emulsion consisting of a multiplicity of adjacent squares or other rectangles, the optical transparency or transmission of each rectangle varying from a minimum (or a maximum) at the center of each rectangle or square to a maximum (or a minimum) at the edge of each square or rectangle. The variation in optical transmission from the center to the edge of each square or other rectangle may be either linear or non-linear depending on various factors which will be discussed more fully below. Such a screen may be used in photography or photoengraving to produce a picture having a suitable structure for direct printing on metal. The appearance of the printing structure formed by this type of screen is similar to that of half-tone negatives made with the commonly used "Levy" cross-line screen. The darker portions or shadows of the original picture are recorded in the negative made through the variable density screen as small dots by the light transmitted through only the most transparent parts of the screen. As progress is made towards the parts of the negative corresponding to the lighter portions of the picture, the dots increase in size and pass through the condition of a uniform checkerboard appearance of alternate dots and clear spaces to the condition representing the extreme highlights of the picture when only the parts of the negative under the centers of the screen squares having minimum transmission are unexposed. Following the usual photoengraving technique, the screen is oriented with respect to the vertical dimension of the picture so that the dots are aligned in rows at 45 degrees to this direction. When this screen is used in connection with the telephotographic or picture transmission receiving system, each elemental square or other rectangle is subjected in turn to light from a suitable light source, the intensity of this light being modulated in accordance with the variations in light tone values of the variously scanned elemental areas of the object at the transmitting station. Thus a picture is obtained which is made up of a plurality of different sized dots or areas.

The system shown in Fig. 1 comprises a light source such as an incandescent lamp 10, a condensing lens system represented generally by the lens 11, a light valve 12 having an aperture 13 substantially in the plane of the light valve ribbon 20, an objective lens system 14 and a drum 15 on which is mounted a film 16 having a light sensitive emulsion thereon, the film being held in place by suitable clips 17.

Reference will now be made to Fig. 2 which shows the elements in the light valve 12 which determine the size and shape of the aperture 13. In this figure, which is a sectional view taken along section line 2—2 in Fig. 1 looking in the direction of the arrows, pairs of plates 18, 18 and 19, 19 determine the shape of the triangular-shaped aperture 13. If desired, the light valve ribbon 20 may be so positioned that it shortens the base and height of this triangular aperture 13.

Unlike a light valve used in telephotographic receiving devices in which the ribbon is caused to move in front of an aperture in accordance with the intensity of signals flowing through the ribbon itself, the ribbon 20 in this invention is held biased to a stationary position by means of a steady biasing current flowing through it. The coil 21 supplies the magnetizing field for the light valve. With the exception of this and the further difference that the pair of plates 18, 18 are differently shaped to determine the shape of aperture 13, the light valve 12 may be, for example, essentially like that described in Patent 2,065,907 to G. E. Perreault, issued December 29, 1936, which is designed primarily for use at a telephotograph receiving station.

By means of the objective lens system 14 an image of the aperture 13 is focussed on the drum 15 carrying the light sensitive film 16. All light except that passing through the aperture 13 is kept from the light sensitive film 16 by means of the hood 22 surrounding the drum 15. A portion of this hood is removable to facilitate mounting, changing and removing the film 16.

The drum 15 is arranged to be rotated about its axis 23 at a constant speed. This speed and the intensity of light used are correlated with the characteristics of the emulsion on film 16 so that the desired transmission properties of the screen are obtained. Means (not shown) are provided for moving the drum 15 and hence the film 16 in a direction along the axis 23 of the drum 15 by an amount equal to one elementary line per revolution of the drum 15. Instead of movement of the drum 15 axially, light beam producing equipment can be adapted to move in this direction with the drum 15 remaining stationary, so far as movement along its axis 23 is concerned. For an example of a system employing the latter type of relative movement, reference may be made to Patent 2,041,822 to A. D. Dowd, issued May 26, 1936. In this patent the movable carriage containing the light source, light valve and focussing systems are mounted on a lead screw to produce longitudinal or axial movement.

The triangular shape of the aperture 13 produces on the film 16 (see Figs. 4 and 7) a number of elemental lines of width $w$, the photographic density of these lines varying from a minimum at the outside edges of the line to a maximum at the center. Aperture 13 is preferably adjusted so that successive elemental lines of the screen will be contiguous without overlap. The portion of the film 16 shown in Fig. 4 is shaded to suggest this density distribution, which is also graphically represented in Fig. 7, where density is plotted against distance in line widths from a reference point.

After the entire film 16 has been exposed, elemental area by elemental area, to the light coming through the aperture 13, the film is taken off the drum 15 in a dark room, turned 90 degrees and remounted on the drum 15. The process of exposing the elemental areas in turn of the film 16 is then repeated to expose traces on the film at right angles to those produced by the preceding operation. Fig. 5 represents the exposed elemental squares or other rectangles. The varied spacing of the parallel lines is indicative of the degree of exposure, which is greatest at the center of each area and which progressively and proportionally (in the case where the aperture 13 is used) decreases to the edges.

After the film 16 has had its surface exposed twice in paths at right angles to each other, the film is taken from the drum 15, developed, fixed, washed and dried in accordance with well-known photograph technique to produce a variable density cross-line screen which may be used in connection with telephotographic receiving equipment described below.

Fig. 6 shows diagrammatically a telephotographic receiving system in which the variable density cross-line screen made as related above is used. If desired, the apparatus shown in Fig. 6 may be the same as that used to make the variable density cross-line screen shown in Fig. 1 with certain changes. In the device shown in Fig. 6, the light valve aperture is not a triangle as shown in Fig. 2 but is instead a square or a parallellogram as disclosed in the above-mentioned Perreault patent and the light valve ribbon 20 is not biased in a fixed position but instead is varied in position in accordance with signals through it which are proportional to the tone values of the successively scanned elemental areas of the object at the transmission station of the telephotographic system.

The cross-line screen 16 is mounted on the drum 15 outside of and preferably in contact with the emulsion of a receiving film 30, the screen emulsion being adjacent that of the film 30. The variations in signals passing through the light valve ribbon 20 vary the size of the aperture 31 in the light valve which in turn vary the amount of light from the source 10 which reaches the film 30 and the screen 16. After the film 30 is developed, fixed, washed and dried, it is suitable for direct printing on metal as it is properly structured for this purpose.

While there has been described above with reference to Fig. 6, a use for the variable density cross-line screen in a telephotographic receiving system, this screen may also be used in photoengraving. In this application of the variable density screen it is placed in contact, emulsion to emulsion, with the negative material rather than spaced therefrom a prescribed distance as is the case when using the ordinary photoengraving screen. This permits the use of simple and common types of photographic equipment rather than the highly specialized and expensive photoengraving camera and its accessories. The size of stops used in the camera, if a camera is employed in order to change the size of the picture, has no direct effect upon the size of the dots formed. The customary use of multiple stops and exposures which complicate and greatly increase the time for exposing the half-tone negative is thus eliminated. Flexibility in control of the printing structure is obtained in a more direct and simple manner by using the particular grade of variable density screen designed for the contrast or density scale of the picture being used. The variables encountered are only those familiar to ordinary photography, that is, exposure and development.

Considering now the variable density screen 16, although the exposure gradient $$\frac{dE}{dx}$$

across each elemental area is essentially constant due to the simple shape of the triangular aperture 13 which was used, the transmission gradient $$\frac{dT}{dx}$$

would obviously not be constant due to the non-linear characteristic of the photographic emulsion. If the latter were linear, and the relationships in all other steps in the process of using the screen to reproduce a structured picture including printing were linear, then the triangular shape of aperture shown in Fig. 2 would be ideal. However, the optimum shape of the aperture would be, in practice, determined by study and measurement of the characteristics of all of these steps involved in photomechanical reproduction. It thus becomes possible to shape the aperture to give a transmission gradient across the unit screen area to produce the most accurate tone reproduction. This gives rise to the desirability of preparing screens by this method having transmission gradient and latitude most suitable for each general class of picture, that is, flat, normal and contrasty. The obvious advantage of having a variety of such screens, as, for example, six to ten, is that their use thus becomes analogous to the use of contact printing papers of different contrast in ordinary photography. At the present time the use of the ordinary cross-line screen is a highly specialized art requiring the use of multiple stops and exposures in order to obtain the most suitable printing plate structure. This technique may be quite widely different for different pictures.

In Fig. 3 there is disclosed an aperture 32 which is of different shape from the aperture 13 shown in Fig. 2 and which may be substituted therefor. The aperture 32 is intended to illustrate how an aperture may be given a desired shape to produce a linear transmission gradient by properly shaping the pairs of plates 33, 33. The method of making the aperture shown in this figure will be explained more fully below with reference to Fig. 8. The screen obtained with this aperture comprises a multiplicity of tiny squares or other rectangles which when developed vary in density from essentially zero at the edges to a maximum density at the center, differing from the screen made in Figs. 1 and 2 in that the change from minimum to maximum transmission is not linear. The curved boundaries of the aperture 32 are merely representative as these curves may be of any desired shape, depending upon the transmission gradient desired in the finished screen.

With respect to the method of designing the shape of the aperture 32, the desired characteristic of the variable density screen would ordinarily be a function of a number of factors which are involved in the over-all process of using such a screen to obtain structural half-tone pictures represented by black and white areas. For example, the contrast ratio in the printed picture which can be used in practice is limited among other things by the physical characteristics of the paper and ink employed. This ratio is a function of the size of the smallest highlight and shadow dots which can be used and is limited by those factors. Aside from these mechanical factors of actual reproduction, each of the steps, such as exposure and etching of the metal plate and the preparation of mats and of stereotypes, alter to a greater or less extent the relationship between the reflection or brightness values of the printed picture relative to the original. Knowing the separate or the over-all combined characteristics of these steps, it is possible to design the shape of the aperture 32 used in exposing the variable density screen to compensate for these factors.

For simplicity in illustration, let it be considered that the shape of the aperture is designed to compensate for the emulsion characteristic shown in the second quadrant of Fig. 8. The maximum transmissibility of a screen made on this emulsion is about 85 per cent, and it can be made to approach a minimum value of less than ½ of 1 per cent. It is assumed that a linear transmission characteristic of the screen is desired as shown in quadrant I of Fig. 8. X is the distance measured from the edge of a scanning line and D is ½ the scanning line pitch. Using the well-known tone reproduction diagram method, the characteristic shown in quadrant IV is found in which the height of the aperture is plotted versus $$\frac{X}{D}$$

to give the linear condition assumed in quadrant I. This shaded area is taken to represent the shape of half of the scanning aperture 32, which is symmetrical about the line A—B. While there has been shown and described with reference to Fig. 8, a method of determining the shape of an aperture to compensate for the distortion introduced by the emulsion characteristic of the cross-line screen, it is preferable to compensate for other distortions resulting in the photographic, mechanical and electrical processes as well, although it is to be understood that correction for any one or a group of distortions may be omitted if desired. After the over-all characteristic (or the characteristic the non-linearity of which it is desired to compensate) is obtained and plotted in quadrant II of Fig. 8, the corresponding shape of one-half of the aperture 33 is easily formed in quadrant IV.

As suggested above, the preferred method of using the invention is to provide a number of screens having different variations in density and in any given case to select the screen which most nearly fulfills the requirements. With one set of shaped aperture plates, several variable density cross-line screens of varying correcting properties can be formed by changing the bias of the light valve. As this also changes the width of the aperture, it is necessary to adjust the optical system 14 so that the width of a scanning line is the same in all cases. Such a set of screens meets a variety of requirements and similar sets may be made with apertures differently shaped.

What is claimed is:

1. The method of preparing a variable density screen for photomechanical reproduction purposes comprising the steps of exposing a photographic film in adjacent parallel elemental strips element by element lengthwise of each strip and the different strips in succession so that the exposure is the same throughout the length of each strip but varies transversely of the strip, and similarly exposing the film in adjacent parallel elemental strips extending in a direction transverse to the first mentioned strips.

2. The method which comprises exposing a light sensitive film to a beam of light having such size and motion relative to said film that parallel, continuous, elemental strips of the latter are traversed in succession, the cross-sectional shape of said beam where it impinges upon said film being such that the exposure of the film transversely of the strip varies from a low value to a high value from the edges of each elemental strip to the center thereof, and similarly exposing the film a second time to produce similar elemental traces perpendicular to the first-mentioned elemental strips.

3. The method of preparing a variable density screen for photomechanical reproduction purposes comprising the steps of exposing a light sensitive film in adjacent parallel elemental strips in succession, the intensity of exposure of each strip varying transversely of its length from the center to the edges thereof in a non-linear manner, and subsequently similarly exposing the film in adjacent parallel elemental strips in succession extending in a direction transverse to the first mentioned strips.

4. The method of preparing a variable density cross-line screen for photo-mechanical reproduction purposes comprising the steps of impinging a beam of light upon a light sensitive film, scanning said film with said beam along adjacent parallel elemental strips of said film, said beam at said film having a cross-sectional area of greater dimension in the direction parallel to the edges of the strips in one portion thereof than in another, and similarly scanning the film in similar adjacent parallel elemental strips extending in a direction transverse to the first-mentioned strips.

5. The method of preparing a variable density cross-line screen for photo-mechanical reproduction purposes comprising the steps of impinging a beam of light upon a photographic film, scanning said film with said beam along adjacent parallel elemental strips of said film, the cross-sectional area of said beam at said film being symmetrical with respect to the center line of a strip and the dimension of each half of said cross-sectional area with respect to said line being relatively great at one extremity of said half area compared with that at the other extremity thereof and continuously varying between said extremities, and similarly scanning the film in similar adjacent parallel elemental strips extending in a direction transverse to the first-mentioned strips.

6. The method of preparing a variable density cross-line screen for photo-mechanical reproduction purposes comprising the steps of impinging a beam of light upon a photographic film, scanning said film with said beam along adjacent parallel elemental strips of said film, the cross-sectional area of said beam at said film being symmetrical with respect to the center line of a strip and the dimension of each half of said cross-sectional area with respect to said line being relatively great at one extremity of said half area compared with that at the other extremity thereof and continuously varying between said extremities in a non-linear manner, and similarly scanning the film in similar adjacent parallel elemental strips extending in a direction transverse to the first-mentioned strips.

7. The method of preparing a variable density cross-line screen for photo-mechanical reproduction purposes comprising the steps of impinging a beam of light upon a photographic film, scanning said film with said beam along adjacent parallel elemental strips of said film, the cross-sectional area of said beam at said film being symmetrical with respect to the center line of a strip and the dimension of each half of said cross-sectional area with respect to said line being relatively great at one extremity of said half area compared with that at the other extremity thereof and continuously varying between said extremities from said lesser value to said greater value at an increasing rate of the nature of that of the light response characteristic of photographic emulsion, and similarly scanning the film in similar adjacent parallel elemental strips extending in a direction transverse to the first-mentioned strips.

FREDERICK W. REYNOLDS.